(12) United States Patent
Shimadu et al.

(10) Patent No.: US 9,983,501 B2
(45) Date of Patent: May 29, 2018

(54) IMAGE FORMING APPARATUS (71) Applicant: BROTHER KOGYO KABUSHIKI KAISHA, Nagoya-shi, Aichi-ken (JP)

(72) Inventors: Michihiro Shimadu, Nagoya (JP); Osamu Takahashi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days. days.

(21) Appl. No.: 15/297,773

(22) Filed: Oct. 19, 2016

(65) Prior Publication Data
US 2017/0108794 A1 Apr. 20, 2017

(30) Foreign Application Priority Data
Oct. 20, 2015 (JP) .................. 2015-205968

(51) Int. Cl.
G03G 15/043 (2006.01)
H04N 1/113 (2006.01)
(Continued)

(52) U.S. Cl.
CPC ......... G03G 15/043 (2013.01); G06K 15/129 (2013.01); H04N 1/113 (2013.01);
(Continued)

(58) Field of Classification Search
CPC combination set(s) only.
See application file for complete search history.

(56) References Cited

U.S. PATENT DOCUMENTS 5,930,019 A 7/1999 Suzuki et al.
2011/0182603 A1 7/2011 Kawamoto
(Continued)

FOREIGN PATENT DOCUMENTS

JP 10-213763 A 8/1998
JP H10-213763 A * 11/1998 ................ B41J 2/44
(Continued)

OTHER PUBLICATIONS

Notice of Reasons for Rejection (Office Action) issued in corresponding Japanese Patent Application No. 2015-205968, dated Apr. 25, 2017.
(Continued)

Primary Examiner — Clayton E Laballe
Assistant Examiner — Jas Sanghera
(74) Attorney, Agent, or Firm — Merchant & Gould P.C.

(57) ABSTRACT

An image forming apparatus comprising: an exposing unit including: a first light source comprising a first light emitter and a first light receiver including a first electric output responsive to a received light quantity of the first light emitter; a second light source comprising a second light emitter and a second light receiver including a second electric output responsive to a received light quantity of the second light emitter; and a first light-source driver electrically connected to the first light source and the second light source. The first light-source driver includes: a first output terminal electrically connected to the first light emitter; a second output terminal electrically connected to the second light emitter; and an input terminal electrically connected to both the first electric output and the second electric output.

20 Claims, 7 Drawing Sheets (51) Int. Cl.
*H04N 1/40* (2006.01)
*G06K 15/12* (2006.01)

(52) U.S. Cl.
CPC ... *H04N 1/4005* (2013.01); *G06K 2215/0094* (2013.01); *H04N 2201/0094* (2013.01)

(56) References Cited

U.S. PATENT DOCUMENTS

| | | | |
|---|---|---|---|
| 2011/0298884 A1* | 12/2011 | Furuta | G02B 26/123 347/224 |
| 2014/0362154 A1 | 12/2014 | Takezawa | |
| 2015/0160582 A1 | 6/2015 | Yamazaki | |

FOREIGN PATENT DOCUMENTS

| | | |
|---|---|---|
| JP | 2011-173412 A | 9/2011 |
| JP | 2014-240872 A | 12/2014 |
| JP | 2015-1114491 A | 6/2015 |
| JP | 2013-120231 A | 12/2016 |

OTHER PUBLICATIONS

Notice of Reasons for Rejection (Office Action) issued in corresponding Japanese Patent Application No. 2015-205968, dated Dec. 13, 2016.

* cited by examiner

IMAGE FORMING APPARATUS

CROSS-REFERENCE TO RELATED APPLICATION

This application claims priority from Japanese Patent Application No. 2015-205968 filed on Oct. 20, 2015, the content of which is incorporated herein by reference in its entirety.

FIELD OF DISCLOSURE

Aspects of the disclosure relate to an image forming apparatus.

BACKGROUND

A known image forming apparatus includes a plurality of light sources, a plurality of light-source drivers, a plurality of photosensitive members, and a controller. The light sources each include two light-emitting portions and a single light detector. The light-source drivers drive the respective light sources. The photosensitive members are provided for the respective light sources. The controller causes each of the light-source drivers to execute a light-quantity adjusting operation and an exposing operation for a corresponding one of the light sources. In the light-quantity adjusting operation, a light-source driver causes a light-emitting portion to emit light therefrom and adjust a light emission quantity of the light-emitting portion based on output from a light detector. In the exposing operation, a light-source driver causes a light-emitting portion to emit light therefrom based on image data to expose a photosensitive member to the light.

SUMMARY

Nevertheless, the known image forming apparatus may need the same number of light-source drivers as the light sources. This may cause, for example, increase in costs of the image forming apparatus or increase in size of a board included in the image forming apparatus.

Accordingly, some embodiments of the disclosure provide for a technique for solving at least one of the above-described problems.

According to one aspect, there is provided an image forming apparatus comprising: an exposing unit including: a first light source comprising a first light emitter and a first light receiver including a first electric output responsive to a received light quantity of the first light emitter; a second light source comprising a second light emitter and a second light receiver including a second electric output responsive to a received light quantity of the second light emitter; and a first light-source driver electrically connected to the first light source and the second light source. The first light-source driver includes: a first output terminal electrically connected to the first light emitter; a second output terminal electrically connected to the second light emitter; and an input terminal electrically connected to both the first electric output and the second electric output.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

DETAILED DESCRIPTION

Figure 1:
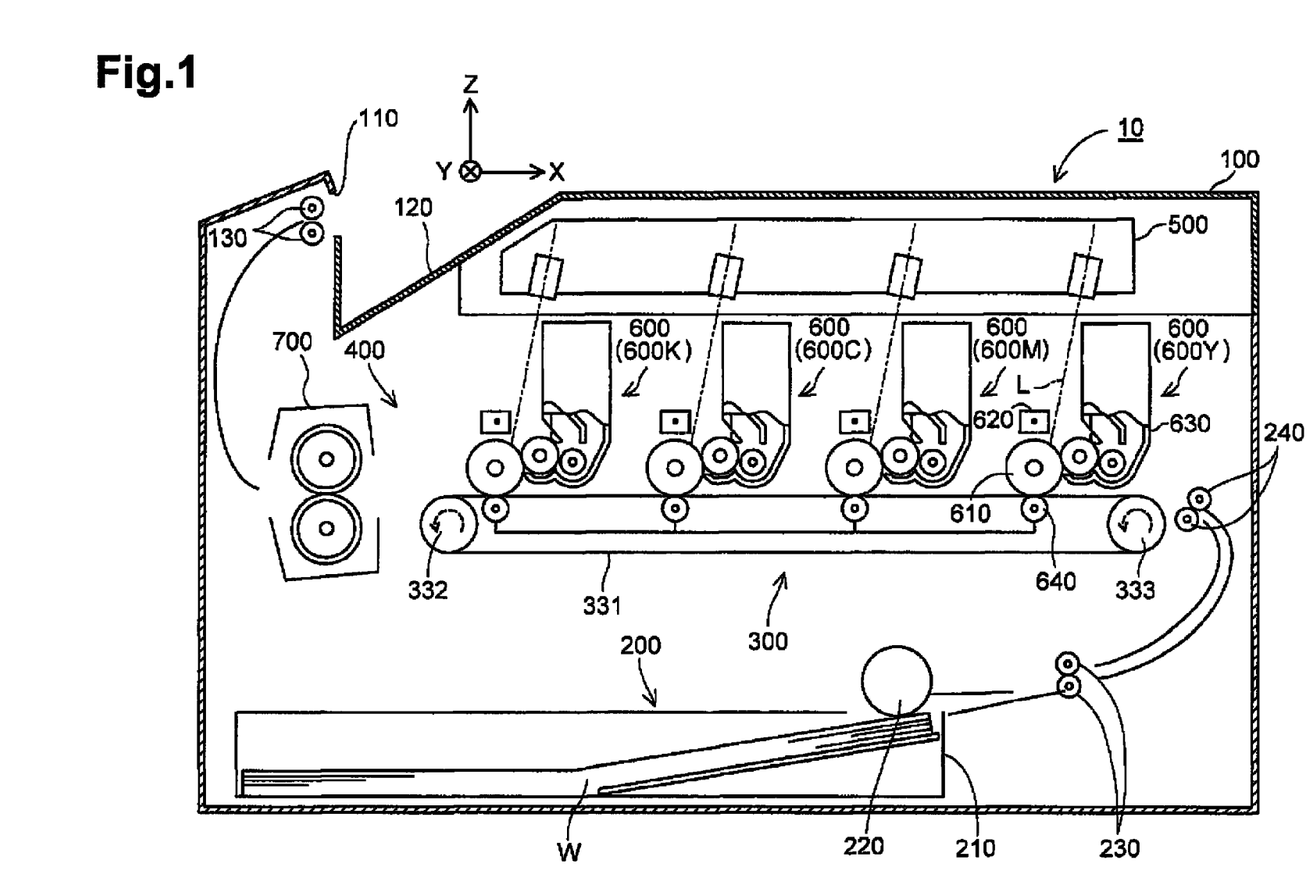
FIG. 1 is a schematic diagram illustrating an overall configuration of a printer in an illustrative embodiment according to one or more aspects of the disclosure.

An illustrative embodiment of a printer 10 will be described with reference to the accompanying drawings. FIG. 1 is a schematic diagram illustrating an overall configuration of the printer 10. In FIG. 1, X-, Y-, and Z-axes orthogonal to each other are indicated for defining directions. In the description below, a positive direction of the Z-axis corresponds to an upward direction, a negative direction of the Z-axis corresponds to a downward direction, a positive direction of the X-axis corresponds to a frontward direction, and a negative direction of the X-axis corresponds to a rearward direction, a positive direction of the Y-axis corresponds to a rightward direction, and a negative direction of the Y-axis corresponds to a leftward direction. These directions are also applied to all of the drawings.

The printer 10 may be an electrophotographic printer configured to form an image onto a sheet W, e.g., a recording sheet or an overhead projector sheet, using toners (e.g. developer) of four colors of, for example, yellow (Y), magenta (M), cyan (C), and black (K). The printer 10 is an example of an image forming apparatus. In the description below, when the same or similar components included in the printer 10 are distinguished by toner color, specific letters Y, M, C, and K representing respective toner colors are appended to their reference numerals, and otherwise, the specific letters Y M, C, and K are omitted appropriately. In the drawings, even when one of the same or similar components is illustrated with a specific letter representing a specific toner color, the illustrated component is merely an example of the components and an explanation for the remainder of the same or similar components will be omitted as necessary.

As illustrated in FIG. 1, the printer 10 includes a housing 100, a sheet supply unit 200, a belt conveyor unit 300, and an image forming unit 400. The housing 100 accommodates therein the sheet supply unit 200, the belt conveyor unit 300, and the image forming unit 400. The printer 10 has a discharge port 110 and a discharge tray 120 defined in an upper portion of the housing 100. The printer 10 further includes discharge rollers 130 at the discharge port 110 in the housing 100.

The sheet supply unit 200 includes a tray 210, a pickup roller 220, conveying rollers 230, and registration rollers 240. The tray 210 is configured to accommodate therein one or more sheets W. The pickup roller 220 picks up one by one the one or more sheets W accommodated in the tray 210. The conveying rollers 230 convey the sheet W picked by the pickup roller 220 toward the registration rollers 240. The registration rollers 240 corrects skewing of the sheet W conveyed by the conveying rollers 230 and further convey the sheet W toward the belt conveyor unit 300.

The belt conveyor unit 300 includes a belt 331, a drive roller 332, and a driven roller 333. The drive roller 332 and the driven roller 333 are configured to rotate on respective axes extending parallel to each other. The belt 331 may be an endless belt. The belt 331 is looped around the drive roller 332 and the driven roller 333 and is configured to rotate following rotation of the drive roller 332. The sheet W conveyed by the registration rollers 240 is positioned on a particular portion of an outer circumferential surface of the belt 331 and is conveyed toward a fixing unit 700 by rotation of the belt 331. The particular portion of the outer circumferential surface of the belt 331 faces photosensitive members 610 of process units 600 of the image forming unit 400 and is hereinafter referred to as a "sheet conveying surface". A plurality of transfer rollers 640 are disposed inside the loop of the belt 331. The transfer rollers 640 are included in the respective process units 600 of the image forming unit 400.

The image forming unit 400 includes an exposing unit 500, the process units 600 for respective toner colors (e.g., process units 600Y, 600M, 600C, and 600K), and the fixing unit 700.

The exposing unit 500 may be a multi-beam scanner. The exposing unit 500 is configured to emit a plurality of, for example, two, laser beams L (e.g., two light beams) to the photosensitive member 610 of each of the process units 600 and to form two scan lines simultaneously on each of the photosensitive members 610. That is, the exposing unit 500 is configured to irradiate each of the process units 600 with two laser beams L.

The process units 600 are disposed in tandem in a direction that a sheet W is conveyed by the belt 331 (e.g., the rearward direction). Hereinafter, a configuration of an yellow process unit 600Y will be described. The process units 600 for the other colors may have the same or similar configuration to the yellow process unit 600Y.

The process unit 600Y includes one of the photosensitive members 610, a charger 620, a developing unit 630, and one of the transfer rollers 640. The photosensitive member 610 may be a rotatable drum. The charger 620 is disposed facing a surface of the photosensitive member 610. The charger 620 is configured to charge the surface of the photosensitive member 610 uniformly. The developing unit 630 stores toner therein and is configured to supply toner onto the surface of the photosensitive member 610. The transfer roller 640 is disposed opposite to the photosensitive member 610 relative to the belt 331.

As the exposing unit 500 irradiates the surface of photosensitive member 610 charged by the charger 620 with laser beams L, an electrostatic latent image is formed on the surface of the photosensitive member 610. Then, as the developing unit 630 supplies toner onto the surface of the photosensitive member 610, the electrostatic latent image formed thereon is developed and thus a toner image is formed on the surface of the photosensitive member 610. The toner image is then transferred, by the transfer roller 640 to which voltage is applied, onto a sheet W that is passing between the photosensitive member 610 and the transfer roller 640 or onto the sheet conveying surface of the belt 331. In the illustrative embodiment, the yellow process unit 600Y, the magenta process unit 600M, the cyan process unit 600C, and the black process unit 600K are disposed in this sequence from upstream in the sheet conveying direction. Therefore, an yellow toner image, a magenta toner image, a cyan toner image, and a black toner image are transferred onto a sheet W being conveyed or onto the sheet conveying surface of the belt 331 one above another.

The fixing unit 700 is disposed downstream of the photosensitive members 610 of the process units 600 in the sheet conveying direction. The fixing unit 700 fixes the toner images transferred onto the sheet W thereon. Therefore, an image is formed onto the sheet W. Then, the discharge rollers 130 discharge the sheet W that has passed the fixing unit 700, onto the discharge tray 120 via the discharge port 110.

Figure 2:
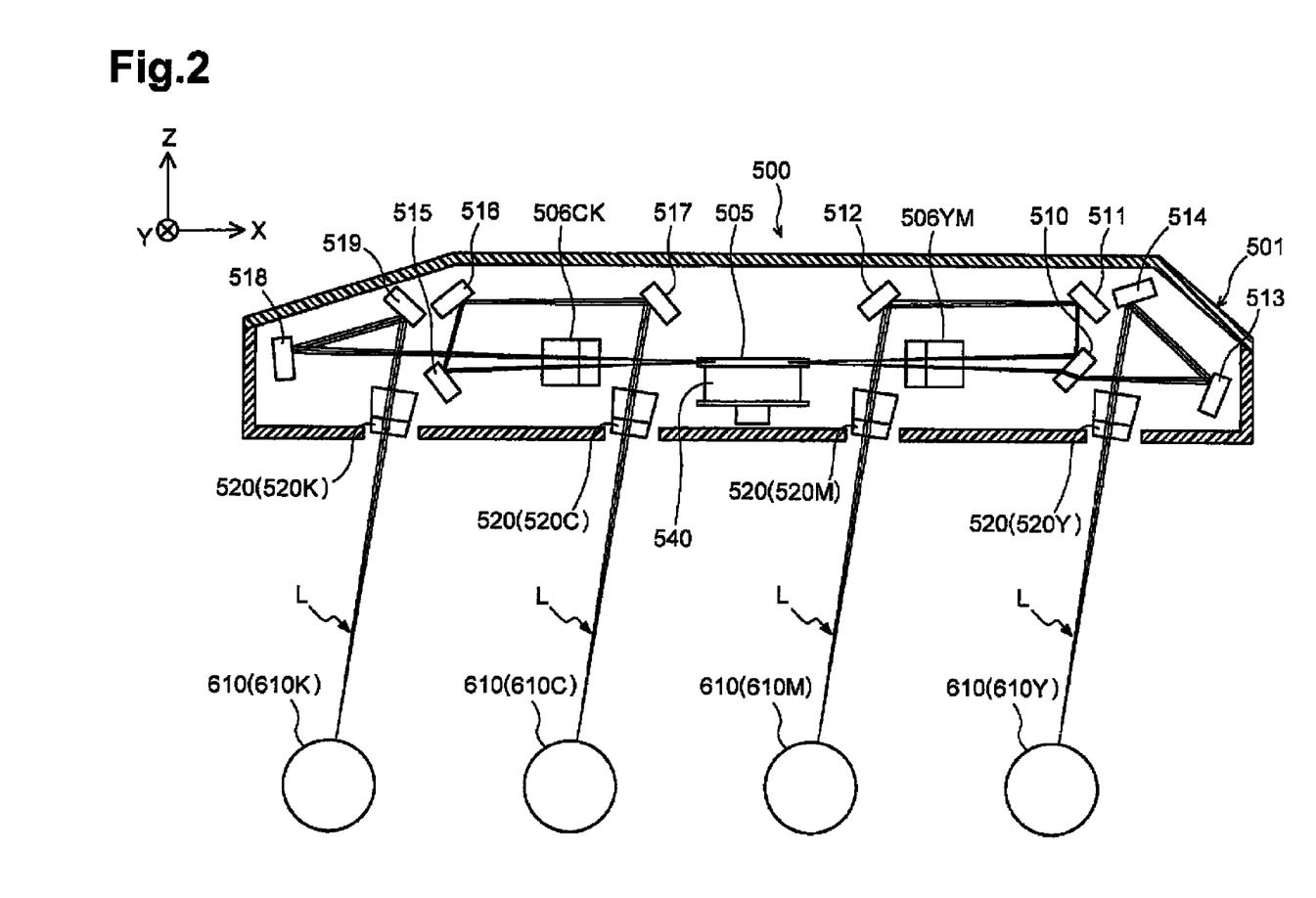
FIG. 2 is a schematic view illustrating an internal configuration of an exposing unit in the illustrative embodiment according to one or more aspects of the disclosure.
Figure 3:
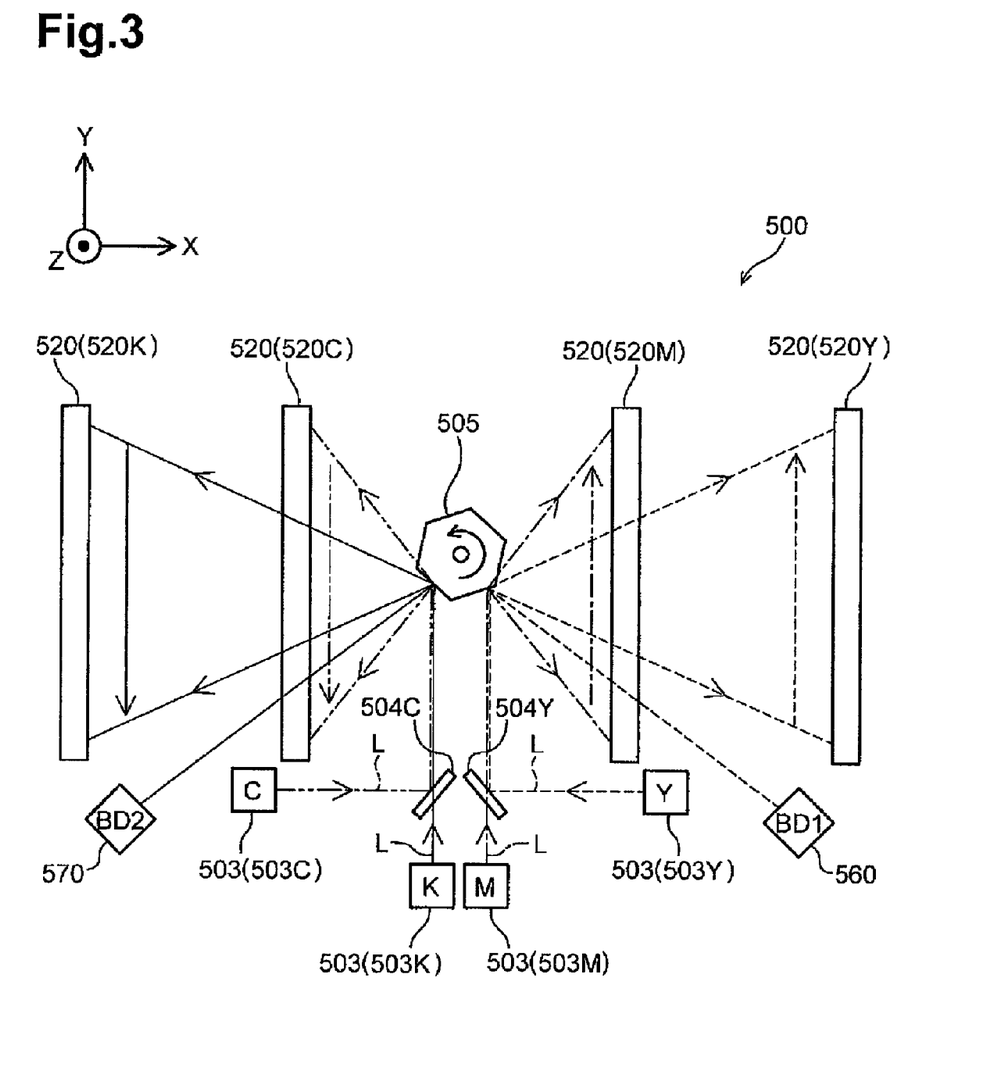
FIG. 3 is a schematic plan view illustrating the internal configuration of the exposing unit in the illustrative embodiment according to one or more aspects of the disclosure.
Figure 4:
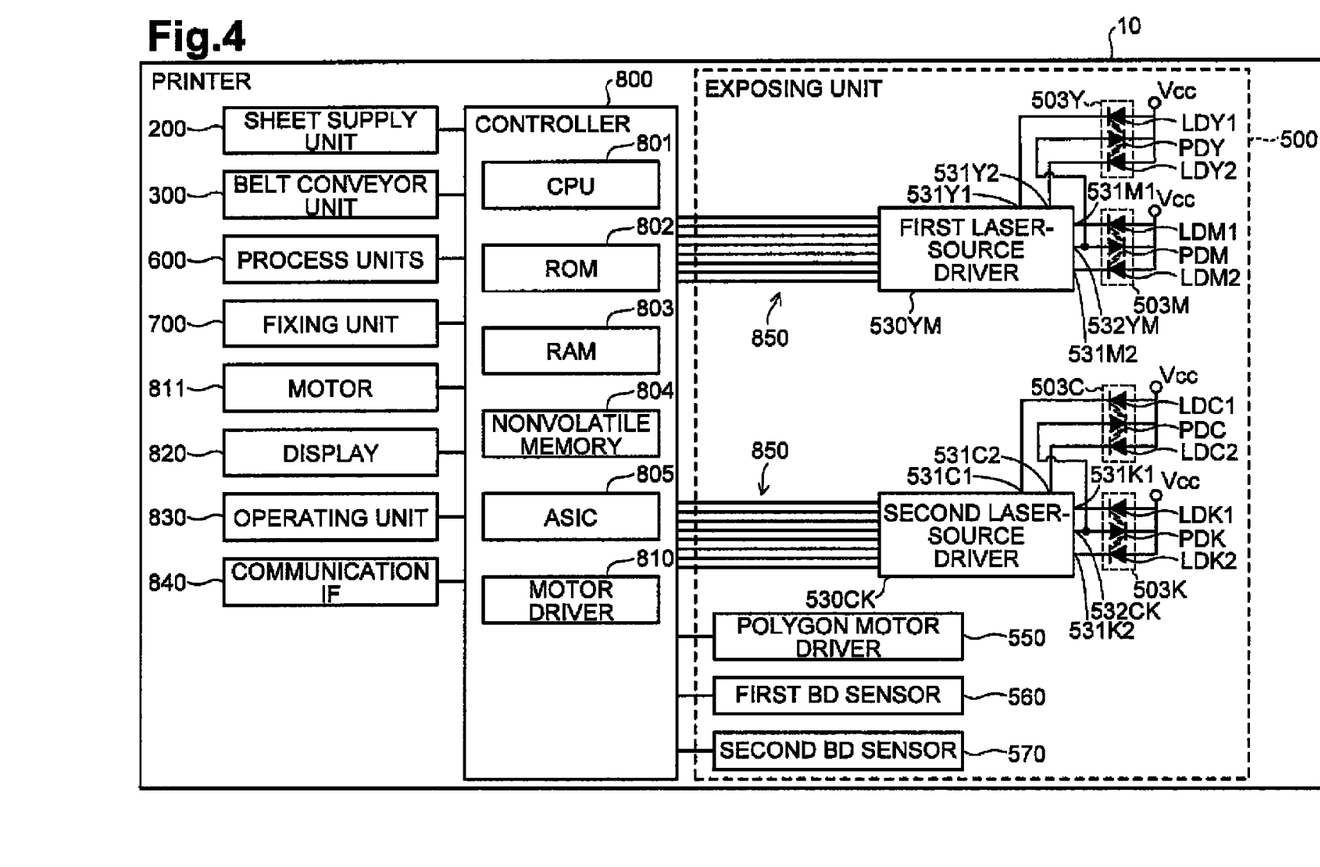
FIG. 4 is a block diagram illustrating an electrical configuration of the printer in the illustrative embodiment according to one or more aspects of the disclosure.

FIG. 2 is a schematic diagram illustrating an internal configuration of the exposing unit 500. FIG. 3 is a schematic top plan view illustrating the internal configuration of the exposing unit 500. FIG. 4 is a block diagram illustrating an electrical configuration of the printer 10. As illustrated in FIGS. 2 and 3, the exposing unit 500 includes a first laser source 503Y, a second laser source 503M, a third laser source 503C, and a fourth laser source 503K (also referred to as laser sources 503 when not distinguishing therebetween), a Y-reflecting mirror 504Y, a C-reflecting mirror 504C, a polygon mirror 505, an Fθ lens 506YM, an Fθ lens 506CK, mirrors 510 to 519, a plurality of, for example, four, toric lenses 520 (e.g., toric lenses 520Y, 520M, 520C, and 520K), a first laser-source driver 530YM, a second laser-source driver 530CK, a polygon motor 540, a first BD sensor 560, and a second BD sensor 570, on a frame 501 thereof. As illustrated in FIG. 4, the exposing unit 500 further includes a polygon motor driver 550. The first laser source 503Y is configured to irradiate a surface of the photosensitive member 610Y of the yellow process unit 600Y with laser beams L. The first laser source 503Y is disposed further to the front than the other laser sources 503M, 503C, and 503K. The second laser source 503M is configured to irradiate a surface of the photosensitive member 610M of the magenta process unit 600M with laser beams L. The second laser source 503M is disposed further to the rear than the first laser source 503Y. The third laser source 503C is configured to irradiate a surface of the photosensitive member 610C of the cyan process unit 600C with laser beams L. The third laser source 503C is disposed further to the rear than the other laser sources 503M, 503C, and 503Y. The fourth laser source 503K is configured to irradiate a surface of the photosensitive member 610K of the black process unit 600K with laser beams L. The fourth laser source 503K is disposed further to the front than the third laser source 503C and further to the rear than the first laser source 503Y and the second laser source 503M. That is, the positional sequence of the laser sources 503 in the rearward direction is the first laser source 503Y, the second laser source 503M, the fourth laser source 503K, and the third laser source 503C.

As illustrated in FIG. 4, each of the laser sources 503 includes, a plurality of, for example, two, light-emitting portions LD and a single monitor element PD. More specifically, for example, the first laser source 503Y includes a first first light-emitting portion LDY1 and a second first light-emitting portion LDY2 and a first monitor element PDY. The second laser source 503M includes a first second light-emitting portion LDM1 and a second second light-emitting portion LDM2 and a second monitor element PDM. The third laser source 503C includes a first third light-emitting portion LDC1 and a second third light-emitting portion LDC2 and a third monitor element PDC. The fourth laser source 503K includes a first fourth light-emitting portion LDK1 and a second fourth light-emitting portion LDK2 and a fourth monitor element PDK.

In each of the laser sources 503, the light-emitting portions LD are disposed in such a manner as to irradiate the surface of the photosensitive member 610 with respective laser beams L that are spaced apart from each other in a front-rear direction. In FIGS. 2 and 3, only one of the laser beams L emitted from the respective light-emitting portions LD is illustrated. Each of the light-emitting portions LD may be, for example, a laser diode, i.e., a light emitting point of a semiconductor laser array. Each of the laser sources 503 includes two light emitting points, i.e., two light-emitting portions LD, on a single semiconductor board (e.g., a chip) constituting the semiconductor laser array. The second laser source 503M and the fourth laser source 503K are mounted on the same circuit board, and the first laser source 503Y and the second laser source 503C are mounted on other respective different circuit boards. Each of the circuit boards is fixed to the frame 501. In each of the laser sources 503, the monitor element PD is positioned at such a location as to be capable of receiving the laser beams L emitted from the respective light-emitting portions LD. The monitor element PD is configured to output electric current responsive to the received light quantity. The monitor element PD may be, for example, a photodiode. The laser sources 503 (e.g., the laser sources 503Y, 503M, 503C, and 503K) are examples of first, second, third, and fourth light sources, respectively. The light-emitting portions LD (e.q., the light-emitting portions LDY1, LDY2, LDM1, LDM2, LDC1, LDC2, LDK1, and LDK2) are examples of a plurality of light emitters. The monitor elements PD (e.q., the monitor elements PDY, PDM, PDC, and PDK) are examples of first, second, third, and fourth light receivers.

The Y-reflecting mirror 504Y is configured to reflect laser beams L emitted from the first laser source 503Y to direct the laser beams L to the polygon mirror 505. Laser beams L emitted from the second laser source 503M travel along their respective optical paths that pass above or below the Y-reflecting mirror 504Y, and are incident on the polygon mirror 505. The C-reflecting mirror 504C is configured to reflect laser beams L emitted from the third laser source 503C to direct the laser beams L to the polygon mirror 505. Laser beams L emitted from the fourth laser source 503K travel along their respective optical paths that pass above or below the C-reflecting mirror 504C, and are incident on the polygon mirror 505. The laser beams L emitted from the respective laser sources 503 are synonymous with the light beams emitted from the respective light-emitting portions of each of the laser sources 503.

The polygon mirror 505 may have a regular hexagonal prism shape having a plurality of, for example, six, side surfaces that may serve as reflecting surfaces. The polygon mirror 505 is driven to rotate by the polygon motor 540. The polygon mirror 505 is disposed between the toric lens 520C and the toric lens 520M in the front-rear direction. The polygon mirror 505 is configured to deflect the laser beams L emitted from the first laser source 503Y and the laser beams L emitted from the second laser source 503M toward the front. The polygon mirror 505 is further configured to deflect the laser beams L emitted from the third laser source 503C and the laser beams L emitted from the fourth laser source 503K toward the rear. The polygon mirror 505 is an example of a deflector.

The Fθ lens 506YM may be an optical element configured to change the scanning speed of the laser beams L that have emitted from the first laser source 503Y and the second laser source 503M and have deflected at a constant angular velocity from the polygon mirror 505 in the rightward direction, to be constant such that each of the laser beams L scans a surface of a corresponding one of the photosensitive members 610Y and 610M at a constant scanning speed. The Fθ lens 506YM is further configured to focus the laser beams L onto the surface of each of the photosensitive members 610Y and 610M appropriately in a right-left direction. The laser beams L whose scanning speed has been changed by the Fθ lens 506YM are reflected by the mirrors 510, 511, and 512 or by the mirrors 513 and 514 and then are focused onto the surfaces of the photosensitive members 610Y and 610M appropriately in the front-rear direction by the respective toric lens 520Y and 520M. The Fθ lens 506CK may be an optical element configured to change the scanning speed of the laser beams L that have emitted from the third laser source 503C and the fourth laser source 503K and have deflected at a constant angular velocity from the polygon mirror 505 in the leftward direction, to be constant such that each of the laser beams L scans a surface of a corresponding one of the photosensitive members 610C and 610K at a constant scanning speed. The Fθ lens 506CK is further configured to focus the laser beams L onto the surface of each of the photosensitive members 610C and 610K appropriately in the right-left direction. The laser beams L whose scanning speed has been changed by the Fθ lens 506CK are reflected by the mirrors 515, 516, and 517 or by the mirrors 518 and 519 and then are focused onto the surfaces of the photosensitive members 610C and 610K appropriately in the front-rear direction by the respective the toric lens 520C and 520K.

The first laser-source driver 530YM may be an integrated circuit ("IC") including a drive circuit for driving the first laser source 503Y and the second laser source 503M. The first laser-source driver 530YM includes a plurality of, for example, four, output terminals 531 (e.g., output terminals 531Y1, 531Y2, 531M1, and 531M2) and an input terminal 532YM. The output terminals 531Y1 and 531Y2 are connected to the first first light-emitting portion LDY1 and the second first light-emitting portion LDY2, respectively, of the first laser source 503Y. The output terminals 531M1 and 531M2 are connected to the first second light-emitting portion LDM1 and the second second light-emitting portion LDM2, respectively, of the second laser source 503M. The output terminals 531Y1, 531Y2, 531M1 and 531M2 are configured to send drive current for causing the respective light-emitting portions LDY1, LDY2, LDM1, and LDM2 to emit laser beams L respectively therefrom. The input terminal 532YM is connected to both of the first monitor element PDY and the second monitor element PDM for common use and is configured to receive an output from each of the first monitor element PDY and the second monitor element PDM. The second monitor element PDM is connected to the input terminal 532YM via a first electrical lead, and the first monitor element PDY is connected to the input terminal 532YM via a second electrical lead extending between the first monitor element PDY and an electrical connection positioned along the first electrical lead. The second laser-source driver 530CK may be an IC including a drive circuit for driving the third laser source 503C and the fourth laser source 503K. The second laser-source driver 530CK includes a plurality of, for example, four, output terminals 531 (e.g., output terminals 531C1, 531C2, 531K1, and 531K2) and an input terminal 532CK. The output terminals 531C1 and 531C2 are connected to the first third light-emitting portion LDC1 and the second third light-emitting portion LDC2, respectively, of the third laser source 503C. The output terminals 531K1 and 531K2 are connected to the first fourth light-emitting portion LDK1 and the second fourth light-emitting portion LDK2, respectively, of the fourth laser source 503K. The output terminals 531C1, 531C2, 531K1, and 531K2 configured to send drive current for causing the respective light-emitting portions LDC1, LDC2, LDK1, and LDK2 to emit laser beams L respectively therefrom. The input terminal 532CK is connected to both of the third monitor element PDC and the fourth monitor element PDK for common use and is configured to receive an output from each of the third monitor element PDC and the fourth monitor element PDK. The fourth monitor element PDK is connected to the input terminal 532CK via a third electrical lead, and the third monitor element PDC is connected to the input terminal 532CK via a fourth electrical lead extending between the third monitor element PDC and an electrical connection positioned along the third electrical lead. The first laser-source driver 530YM is an example of a first light-source driver. The second laser-source driver 530CK is an example of a second light-source driver.

The polygon motor 540 is configured to rotate the polygon mirror 505. The polygon motor driver 550 may be a drive circuit configured to drive the polygon motor 540. The first BD sensor 560 is disposed to the left of the toric lens 520Y. The polygon mirror 505 reflects laser beams L by one of the reflecting surfaces that is angled at particular degrees relative to a direction that the first laser source 503Y emits the laser beams L. The first BD sensor 560 is positioned at such a location where the laser beams L reflected off the reflecting surface of the polygon mirror 505 can be incident on the first BD sensor 560. The first BD sensor 560 is configured to output a BD signal in response to receipt of the laser beams L. The first BD sensor 560 is an example of an optical sensor. The second BD sensor 570 is disposed to the left of the toric lens 520K. The polygon mirror 505 reflects laser beams L by another one of the reflecting surfaces that is angled at particular degrees relative to a direction that the fourth laser source 503K emits the laser beams L. The second BD sensor 570 is positioned at such a location where the laser beams L reflected off the reflecting surface of the polygon mirror 505 can be incident on the second BD sensor 570. The second BD sensor 570 is configured to output a BD signal in response to receipt of the laser beams L.

While the polygon mirror 505 rotates by rotation of the polygon motor 540, the inclination angle of the reflecting surface being reflecting laser beams L of the polygon mirror 505 relative to the direction that the two light-emitting portions LD of the laser source 503 emit the respective laser beams L changes periodically. Therefore, the laser beams L emitted from the respective light-emitting portions LD are deflected off the reflecting surface periodically. Thus, two scan lines are formed simultaneously on the surface of the photosensitive member 610 by the two laser beams L.

As illustrated in FIG. 4, the printer 10 further includes a controller 800, a motor 811, a display 820, an operating unit 830, and a communication interface ("IF") 840 as well as the sheet supply unit 200, the belt conveyor unit 300, and the image forming unit 400. The controller 800 is an example of a controller.

The controller 800 includes a central processing unit ("CPU") 801, a read-only memory ("ROM") 802, a random access memory ("RAM") 803, a nonvolatile memory 804, an application specific integrated circuit ("ASIC") 805, and a motor driver 810. The ROM 802 stores control programs for controlling the printer 10 and various setting information. The RAM 803 is used as a working area to be used by the CPU 801 executing various programs or as a storage area for storing data therein temporarily. The nonvolatile memory 804 is a rewritable memory such as a nonvolatile RAM, a flash memory, a hard disk drive, or an electrically erasable programmable ROM ("EEPROM"). The ASIC 805 is a hardware circuit for implementing, for example, image processing. The CPU 801 is configured to control the components of the printer 10 in accordance with a control program read from the ROM 802 or signals transmitted from sensors. The motor driver 810 is configured to drive the motor 811.

The motor 811 is configured to drive (e.g., rotate) the pickup roller 220, the registration rollers 240, the drive roller 332, and the photosensitive members 610. The display 820 may be, for example, a liquid crystal display. The display 820 is configured to display various information thereon in response to instructions from the controller 800. The operating unit 830 includes various buttons for accepting user operations. The communication interface 840 is hardware that enables communication between the printer 10 and an external device. The communication interface 840 may be, for example, a network interface, a serial communication interface, or a parallel communication interface.

The controller 800 is connected to the first laser-source driver 530YM via a plurality of, for example, eight, connecting wires 850 and is also connected to the second laser-source driver 530CK via another plurality of, for example, eight, connecting wires 850. Four of each of the eight connecting wires 850 are used for transmitting, from the controller 800 to a corresponding one of the respective laser-source drivers 530, an execution instruction for a light-quantity adjusting operation for each of four light-emitting portions LD driven by a corresponding one of the laser-source drivers 530 (hereinafter, this instruction is also referred to as "light-quantity adjusting operation instruction"). The light-quantity adjusting operation instruction may be an execution instruction for a light-quantity adjusting operation in which a laser-source driver 530 causes a light-emitting portion LD to emit a laser beam L therefrom and adjusts a light emission quantity of the light-emitting portion LD in accordance with output (e.g., an amount of current) from a monitor element PD that has received the laser beam L emitted by the light-emitting portion LD. The remainder four of the connecting wires 850 are used for transmitting, from the controller 800 to a corresponding one of the laser-source drivers 530, an execution instruction for an exposing operation for each of four light-emitting portions LD driven by a corresponding one of the laser-source drivers 530 (hereinafter, this instruction is also referred to as "exposing operation instruction"). The exposing operation instruction may be an execution instruction for an exposing operation in which a laser-source driver 530 causes a light-emitting portion LD to emit a laser beam L therefrom to expose a surface of a photosensitive member 610 to the laser beam L emitted from the light-emitting portion LD.

Figure 5:
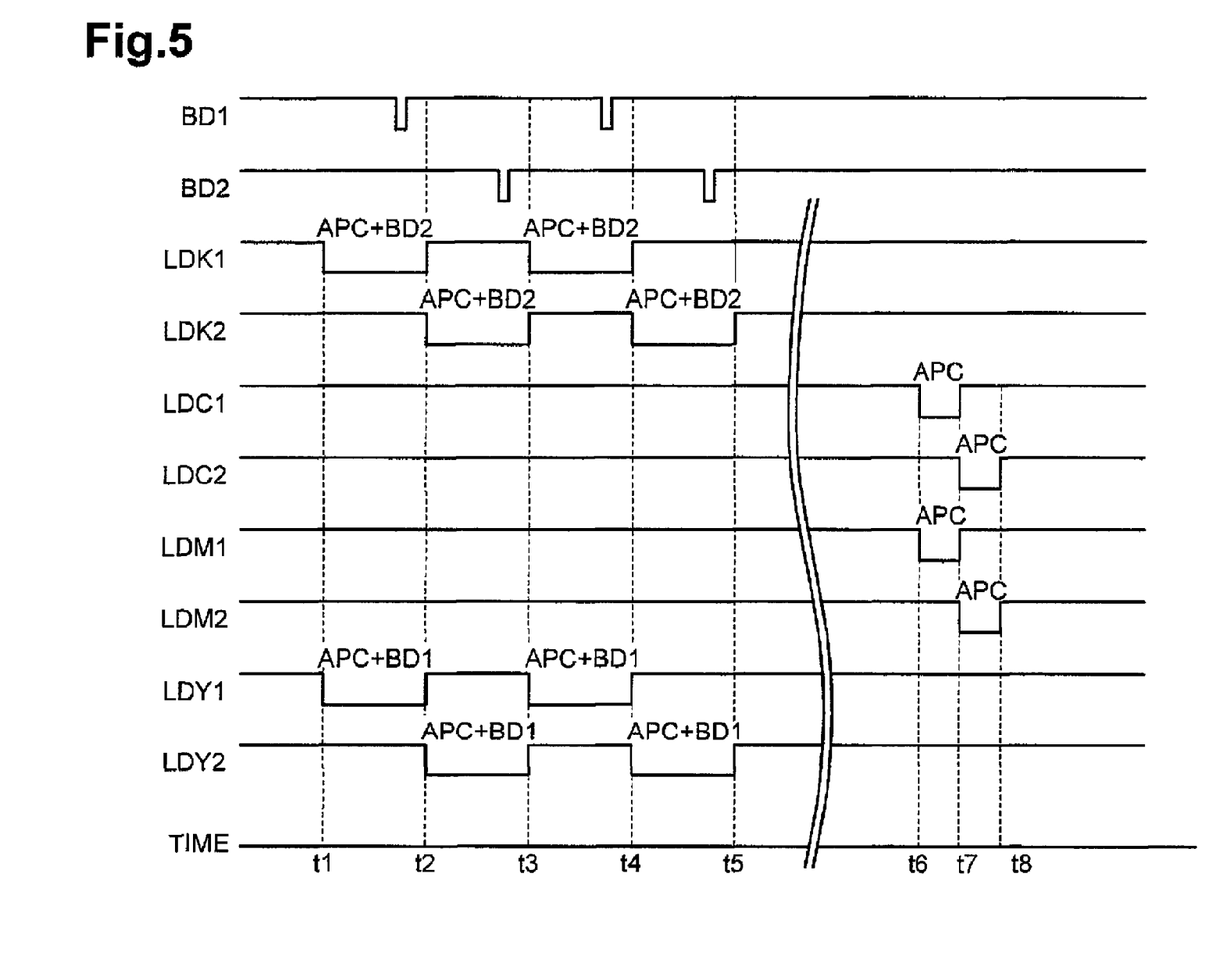
FIG. 5 is a timing chart illustrating a relationship between an operation timing of each of the light-emitting portions LD and a receiving timing of a BD signal from each of a first BD sensor and a second BD sensor in a startup process in the illustrative embodiment according to one or more aspects of the disclosure.

FIG. 5 is a timing chart illustrating a relationship between an operation timing of each of the light-emitting portions LD and a receiving timing of a BD signal from each of the first BD sensor 560 and the second BD sensor 570 in a startup process. The startup process may be executed prior to a printing process for forming an image onto a sheet W.

Figure 6:
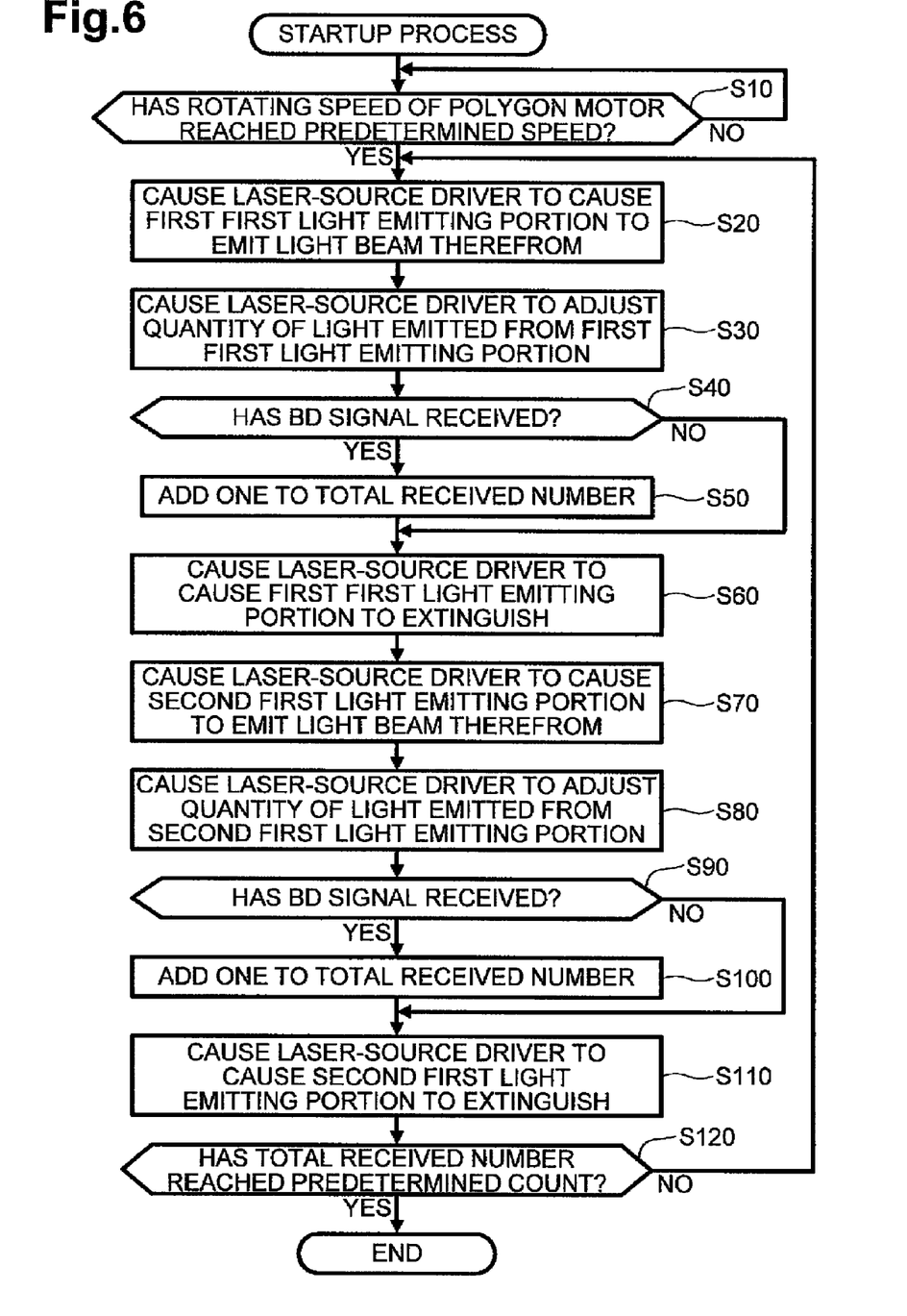
FIG. 6 is a flowchart of an example startup process in the illustrative embodiment according to one or more aspects of the disclosure.

FIG. 6 is a flowchart of the startup process for the first laser source 503Y. As the polygon motor 540 starts rotating by driving of the polygon motor driver 550, the controller 800 executes the startup process. The controller 800 determines whether the rotating speed of the polygon motor 540 (i.e., the polygon mirror 505) has reached a predetermined speed (e.g., step S10). In a case where the controller 800 determines that the rotating speed of the polygon motor 540 has not reached the predetermined speed (e.g., NO in step S10), the routine repeats step S10. In a case where the controller 800 determines that the rotating speed of the polygon motor 540 has reached the predetermined speed (e.g., YES in step S10, at timing t1 in FIG. 5), the controller 800 executes a BD light emitting operation (e.g., "APC" ("APC" stands for automatic power control)+BD1" of LDY1 in FIG. 5) for a period from timing t1 to timing t2 for light quantity adjustment and BD signal acquisition. In the BD light emitting operation, one (e.g., the first first light-emitting portion LDY1) of the light-emitting portions LDY1 and LDY2 of the first laser source 503Y is caused to emit a laser beam L therefrom.

More specifically, for example, the controller 800 controls the first laser-source driver 530YM to cause the first first light-emitting portion LDY1 to emit a laser beam L therefrom (e.g., step S20). During an exposing operation, a scanning period and a non-scanning period occur. In the scanning period, laser beams L reflected off the polygon mirror 505 by rotation of the polygon mirror 505 may be irradiated onto the surface of the photosensitive member 610. The non-scanning period occurs prior to and subsequent to the scanning period. In the non-scanning period, the reflected laser beams L is not irradiated onto the surface of the photosensitive member 610. At the startup process stage, the scanning period and the non-scanning period might not be identified. Therefore, the controller 800 causes the first first light-emitting portion LDY1 to emit a laser beam L for a first reference period in response to the rotating speed of the polygon motor 540 reaching the predetermined speed. The first reference period corresponds to a duration of the period from timing t1 to timing t2 and also corresponds to a half of a duration of the time required for scanning a single reflecting surface of the polygon mirror 505 entirely by a laser beam L. In other words, the first reference period corresponds to a half of a duration of the time obtained by dividing the time required by the polygon mirror 505 that fully turns (e.g., one cycle turn) by the number of reflecting surfaces of the polygon mirror 505 (e.g., six in the illustrative embodiment).

Subsequent to step S20, the controller 800 controls the first laser-source driver 530YM to execute a light-quantity adjusting operation for the first first light-emitting portion LDY1 (e.g., step S30). More specifically, for example, the first laser-source driver 530YM adjusts the drive current to be supplied to the first first light-emitting portion LDY1 such that, when the first first light-emitting portion LDY1 emits a laser beam L therefrom, output (e.g., the amount of current) from the first monitor element PDY that has received the laser beam L from the first first light-emitting portion LDY1 becomes approximate to a particular output corresponding to target light emission quantity.

Subsequent to step S30, the controller 800 determines whether a BD signal that is outputted by the first BD sensor 560 in response to receipt of the laser beam L emitted from the first first light-emitting portion LDY1 has been received during the light-quantity adjusting operation (e.g., step S40). In a case where the controller 800 determines that such a BD signal has been received (e.g., YES in step S40), the controller 800 adds 1 (one) to the total number of BD signals that have been received (hereinafter, referred to as the "total received number") (e.g., step S50). Subsequent to step S50, the controller 800 controls the first laser-source driver 530YM to cause the first first light-emitting portion LDY1 to extinguish at timing t2 (e.g., step S60). In a case where the controller 800 determines that such a BD signal has not been received (e.g., NO in step S40), the controller 800 controls the first laser-source driver 530YM to cause the first first light-emitting portion LDY1 to extinguish at timing t2 without adding 1 (one) to the total received number (e.g., step S60).

Subsequent to step S60, the controller 800 executes a BD light emitting operation (e.g., "APC+BD1" of LDY2 in FIG. 5) for a period from timing t2 to timing t3 (refer to FIG. 5) for light quantity adjustment and BD signal acquisition. In this BD light emitting operation, the controller 800 causes the other (e.g., the second first light-emitting portion LDY2) of the light-emitting portions LDY1 and LDY2 of the first laser source 503Y to emit a laser beam L therefrom. More specifically, for example, the controller 800 controls the first laser-source driver 530YM to cause the second first light-emitting portion LDY2 to emit a laser beam L therefrom (e.g., step S70). The controller 800 causes the second first light-emitting portion LDY2 to emit a laser beam L therefrom for the first reference period. Subsequent to this, the controller 800 controls the first laser-source driver 530YM to execute a light-quantity adjusting operation for the second first light-emitting portion LDY2 (e.g., step S80). More specifically, for example, the first laser-source driver 530YM adjusts the drive current to be supplied to the second first light-emitting portion LDY2 such that, when the second first light-emitting portion LDY2 emits a laser beam L therefrom, output (e.g., the amount of current) from the first monitor element PDY that has received the laser beam L from the second first light-emitting portion LDY2 becomes approximate to a particular output corresponding to target light emission quantity.

Subsequent to step S80, the controller 800 determines whether a BD signal that is outputted by the first BD sensor 560 in response to receipt of the laser beam L emitted from the second first light-emitting portion LDY2 has been received during the light-quantity adjusting operation (e.g., step S90). In a case where the controller 800 determines that such a BD signal has been received (e.g., YES in step S90), the controller 800 adds 1 (one) to the total received number (e.g., step S100). Subsequent to step S100, the controller 800 controls the first laser-source driver 530YM to cause the second first light-emitting portion LDY2 to extinguish at timing t3 (e.g., step S110). In a case where the controller 800 determines that such a BD signal has not been received (e.g., NO in step S90), the controller 800 controls the first laser-source driver 530YM to cause the second first light-emitting portion LDY2 to extinguish at timing t3 without adding 1 (one) to the total received number (e.g., step S110). The period from timing t1 to timing t3 corresponds to a duration of the time required for scanning a single reflecting surface of the polygon mirror 505 entirely by a laser beam L. That is, for the period from timing t1 to timing t3, a BD signal that is outputted by the first BD sensor 560 in response to receipt of the laser beam L emitted from either one of the light-emitting portions LDY1 and LDY2 of the first laser source 503Y is received once.

The total received number may be the total number of times that BD signals have been received from the first BD sensor 560. The count of the total received number is initially zero in the startup process. The controller 800 determines whether the total received number has reached a predetermined count (e.g., between five and ten times) (e.g., step S120). In a case where the controller 800 determines that the total received number has not reached the predetermined count (e.g., NO in step S120), the routine returns to step S20 and the controller 800 executes steps S20 to S110 again appropriately. That is, in a period from timing t3 to timing t4, the controller 800 executes steps S20 to S60 that have executed in the period from timing t1 to timing t2, and in a period from timing t4 to timing t5, the controller executes steps S70 to S110 that have been executed in the period from timing t2 to timing t3. In a case where the controller 800 determines that the total received number has reached the predetermined count (e.g., YES in step S120), the controller 800 ends the startup process. At the time of ending the startup process, the rotating speed of the polygon motor 540 is maintained at the predetermined speed. As a result, based on the receiving timing of the BD signal, the timing of the scanning period and the timing of the non-scanning period of the laser beams L for the respective colors are determined. Subsequent to the completion of the startup process, a light-emitting period of each of the light-emitting portions LDY1 and LDY2 of the first laser source 503Y in the non-scanning period is changed to a second reference period that may be shorter than the first reference period, and one of the light-emission period of the first first light-emitting portion LDY1 and the light-emission period of the second first light-emitting portion LDY2 is determined so as to include the BD signal receiving timing.

As illustrated in FIG. 5, the controller 800 executes another BD light emitting operation (e.g., "APC+BD2" of LDK1 in FIG. 5) for the period from timing t1 to timing t2 for light quantity adjustment and BD signal acquisition. In this BD light emitting operation, the controller 800 causes one (e.g., the first fourth light-emitting portion LDK1) of the light-emitting portions LDK1 and LDK2 of the fourth laser source 503K to emit a laser beam L therefrom. That is, the BD light emitting operation for the first fourth light-emitting portion LDK1 of the fourth laser source 503K is executed in the same period as the period in which the BD light emitting operation for the first first light-emitting portion LDY1 of the first laser source 503Y is executed. Although details of steps executed by the controller 800 during the BD light emitting operation for the first fourth light-emitting portion LDK1 are different from the steps of FIG. 6 (e.g., steps S20 to S60) in point that the second BD sensor 570 and the fourth laser source 503K are used, the other points are substantially the same as the steps of FIG. 6. Therefore, an detailed explanation for the steps will be omitted. Based on a time difference between the receiving timing of a BD signal from the first BD sensor 560 and the receiving timing of a BD signal from the second BD sensor 570, a writing timing of each of the third laser source 503C and the fourth laser source 503K may be corrected. Consequently, the time difference in writing timing between the third laser source 503C and the fourth laser source 503K caused due to deformation of the exposing unit 500 may be reduced.

As illustrated in FIG. 5, the controller 800 executes another BD light emitting operation (e.g., "APC+BD2" of LDK2 in FIG. 5) for the period from timing t2 to timing t3 for light quantity adjustment and BD signal acquisition. In this BD light emitting operation, the controller 800 causes the other (e.g., the second fourth light-emitting portion LDK2) of the fourth light-emitting portions LDK1 and LDK2 of the fourth laser source 503K to emit a laser beam L therefrom. That is, the BD light emitting operation for the second fourth light-emitting portion LDK2 of the fourth laser source 503K is executed in the same period as the period in which the BD light emitting operation for the second fourth light-emitting portion LDK2 of the first laser source 503Y is executed. Although details of steps executed by the controller 800 during the BD light emitting operation for the second fourth light-emitting portion LDK2 are different from the steps of FIG. 6 (e.g., steps S70 to S110) in point that the second BD sensor 570 and the fourth laser source 503K are used, the other points are substantially the same as the steps of FIG. 6. Therefore, an detailed explanation for the steps will be omitted.

Subsequent to completion of the startup process for each of the first laser source 503Y and the fourth laser source 503K, a light-quantity adjusting operation for each of the second laser source 503M and the third laser source 503C (refer to "APC" of each of LDM1, LDM2, LDC1, and LDC2 in FIG. 5) is executed. That is, the light-quantity adjusting operations for the second laser source 503M and the third laser source 503C are executed at a different timing from the light-quantity adjusting operations for the first laser source 503Y and the fourth laser source 503K. More specifically, for example, the light-quantity adjusting operation for one (e.g., the first second light-emitting portion LDM1) of the light-emitting portions LDM1 and LDM2 of the second laser source 503M is executed in the same period (e.g., in a period from timing t6 to timing t7 in FIG. 5) as the period in which the light-quantity adjusting operation for one (e.g., the first third light-emitting portion LDC1) of the third laser source 503C is executed. In the light-quantity adjusting operation for the first second light-emitting portion LDM1, the first laser-source driver 530YM causes the first second light-emitting portion LDM1 to emit a laser beam L therefrom in the non-scanning period and the first laser-source driver 530YM adjusts the drive current to be supplied to the first second light-emitting portion LDM1 such that, when the first second light-emitting portion LDM1 emits a laser beam L therefrom, output (e.g., the amount of current) from the first monitor element PDY that has received the laser beam L from the first second light-emitting portion LDM1 becomes approximate to a particular output corresponding to target light emission quantity. In the light-quantity adjusting operation for the first third light-emitting portion LDC1, the second laser-source driver 530CK causes the first third light-emitting portion LDC1 to emit a laser beam L therefrom in the non-scanning period and the second laser-source driver 530CK adjusts the drive current to be supplied to the first third light-emitting portion LDC1 such that, when the first third light-emitting portion LDC1 emits a laser beam L therefrom, output (e.g., the amount of current) from the third monitor element PDC that has received the laser beam L from the first third light-emitting portion LDC1 becomes approximate to a particular output corresponding to target light emission quantity.

A light-quantity adjusting operation for the other (e.g., the second light-emitting portion LDM2) of the second laser source 503M is executed in the same period (e.g., in a period from timing t7 to timing t8 in FIG. 5) as a period in which a light-quantity adjusting operation for the other (e.g., the second third light-emitting portion LDC2) of the third laser source 503C is executed. In the light-quantity adjusting operation for the second second light-emitting portion LDM2, the first laser-source driver 530YM causes the second second light-emitting portion LDM2 to emit a laser beam L therefrom in the non-scanning period and the first laser-source driver 530YM adjusts the drive current to be supplied to the second light-emitting portion LDM2 such that, when the second second light-emitting portion LDM2 emits a laser beam L therefrom, output (e.g., the amount of current) from the first monitor element PDY that has received the laser beam L from the second second light-emitting portion LDM2 becomes approximate to a particular output corresponding to target light emission quantity. In the light-quantity adjusting operation for the second third light-emitting portion LDC2, the second laser-source driver 530CK causes the second third light-emitting portion LDC2 to emit a laser beam L therefrom in the non-scanning period and the second laser-source driver 530CK adjusts the drive current to be supplied to the second third light-emitting portion LDC2 such that, when the second third light-emitting portion LDC2 emits a laser beam L therefrom, output (e.g., the amount of current) from the first monitor element PDY that has received the laser beam L from the second third light-emitting portion LDC2 becomes approximate to a particular output corresponding to target light emission quantity.

The second reference period is specified for the light-emitting period of each of the light-emitting portions LDM1 and LDM2 of the second laser source 503M and each of the light-emitting portions LDC1 and LDC2 of the third laser source 503C to be occurred at timing t6 or later. The light-quantity adjusting operation for each of the light-emitting portions LDM1, LDM2, LDC1, and LDC2 may be required to be executed at least once between after completion of the startup process and before execution of an initial light emitting operation in accordance with image data.

Figure 7:
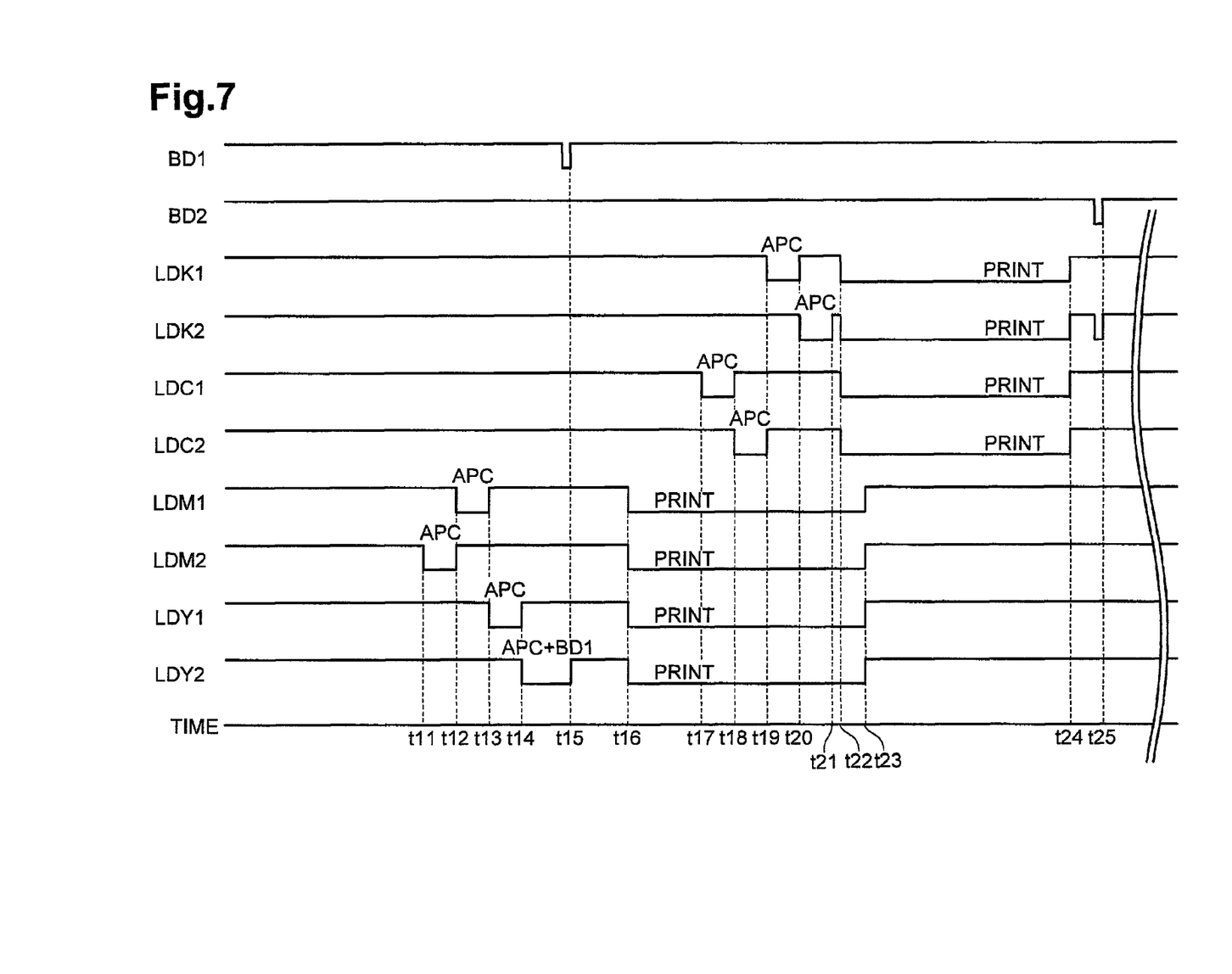
FIG. 7 is a timing chart illustrating a relationship between an operation timing of each of the light-emitting portions LD and a receiving timing of a BD signal from each of the first BD sensor and the second BD sensor in a printing process in the illustrative embodiment according to one or more aspects of the disclosure.

FIG. 7 is a timing chart illustrating a relationship between an operation timing of each of the light-emitting portions LD and a receiving timing of a BD signal from each of the first BD sensor 560 and the second BD sensor 570 in a printing process. In the printing process, a light-quantity adjusting operation is executed for each of the first laser source 503Y and the second laser source 503M. More specifically, for example, a light-quantity adjusting operation (e.g., "APC" of LDM2 in FIG. 7) is executed for the second second light-emitting portion LDM2 in a period from timing t11 to timing t12 in FIG. 7, and another light-quantity adjusting operation (e.g., "APC" of LDM1 in FIG. 7) is executed for the first second light-emitting portion LDM1 in a period from timing t12 to timing t13 of FIG. 7. Then, another light-quantity adjusting operation (e.g., "APC" of LDY1 in FIG. 7) is executed for the first first light-emitting portion LDY1 in a period from timing t13 to timing t14 of FIG. 7. While a light-quantity adjusting operation (e.g., "APC" of LDY2 in FIG. 7) is executed for the second first light-emitting portion LDY2 in a period from timing t14 to timing t15 of FIG. 7, a laser beam L emitted from the second first light-emitting portion LDY2 is incident on the first BD sensor 560. Thus, a BD signal outputted from the first BD sensor 560 is received. As described above, the light-quantity adjusting operations for the four light-emitting portions LDY1, LDY2, LDM1, and LDM2 of the first laser source 503Y and the second laser source 503M are executed in the respective different periods.

Subsequent to the light-quantity adjusting operation for each of the first laser source 503Y and the second laser source 503M, an exposing operation by the first laser source 503Y and an exposing operation by the second laser source 503M are executed in the same period with reference to the receiving timing (e.g., at timing t15 of FIG. 7) of a BD signal from the first BD sensor 560. More specifically, for example, in a period from timing t16 to timing t23 of FIG. 7, the first laser-source driver 530YM causes the light-emitting portions LDY1 and LDY2 of the first laser source 503Y to emit laser beams L therefrom respectively in accordance with image data of a single line to expose the surface of the photosensitive member 610Y and also causes the light-emitting portions LDM1 and LDM2 of the second laser source 530M to emit laser beams L respectively in accordance with image data of a single line to expose the surface of the photosensitive member 610M. A duration of the exposing operation period may be substantially the same as the duration of the scanning period. Executing the exposing operations of the four light-emitting portions in the same period may include a case where the periods of the exposing operations of the four light-emitting portions at least partially overlap each other.

A light-quantity adjusting operation for the third laser source 503C and a light-quantity adjusting operation for the fourth laser source 503K are executed in the same period as the period in which the exposing operation by the first laser source 503Y and the exposing operation by the second laser source 503M are executed. More specifically, for example, a light-quantity adjusting operation for the first third light-emitting portion LDC1 of the third laser source 503C is executed in a period from timing t17 to timing t18 of FIG. 7, and a light-quantity adjusting operation for the second third light-emitting portion LDC2 of the third laser source 503C is executed in a period from timing t18 to timing t19 of FIG. 7. A light-quantity adjusting operation for the first fourth light-emitting portion LDK1 of the fourth laser source 503K is executed in a period from timing t19 to timing t20 of FIG. 7, and a light-quantity adjusting operation for the second fourth light-emitting portion LDK2 of the fourth laser source 503K is executed in a period from timing t20 to timing t21 of FIG. 7. As described above, the light-quantity adjusting operations for the four light-emitting portions LDC1, LDC2, LDK1, and LDK2 of the third laser source 503C and the fourth laser source 503K are executed in the respective different periods.

Subsequent to the light-quantity adjusting operation for each of the third laser source 503C and the fourth laser source 503K, an exposing operation by the third laser source 503C and an exposing operation by the fourth laser source 503K are executed in the same period with reference to the receiving timing (e.g., at timing t15 of FIG. 7) of a BD signal from the first BD sensor 560. More specifically, for example, in a period from timing t22 to timing t24 of FIG. 7, the second laser-source driver 530CK causes the light-emitting portions LDC1 and LDC2 of the third laser source 530C to emit laser beams L therefrom respectively in accordance with image data of a single line to expose the surface of the photosensitive member 610C and also causes the light-emitting portions LDK1 and LDK2 of the fourth laser source 530K to emit laser beams L therefrom respectively in accordance with image data of a single line to expose the surface of the photosensitive member 610K. A duration of the exposing operation period may be substantially the same as the duration of the scanning period. In the non-scanning period subsequent to the exposing operations, the second laser-source driver 530CK causes the second fourth light-emitting portion LDK2 of the fourth laser source 503K to emit a laser beam L therefrom. The laser beam L emitted from the second fourth light-emitting portion LDK2 of the fourth laser source 503K is incident on the second BD sensor 570. Thus, a BD signal outputted from the second BD sensor 570 is received (e.g., at timing t25 of FIG. 7).

According to the illustrative embodiment, the first laser-source driver 530YM executes the light-quantity adjusting operation for the first laser source 503Y and the light-quantity adjusting operation for the second laser source 503M in the respective different periods (refer to FIG. 5 and the period from timing t11 to timing t15 of FIG. 7). The second laser-source driver 530CK executes the light-quantity adjusting operation for the third laser source 503C and the light-quantity adjusting operation for the fourth laser source 503K in the respective different periods (e.g., FIG. 5 and the period from timing t16 to timing t21 of FIG. 7). Therefore, while a single laser-source driver 530 is configured to drive a plurality of laser sources 503, the light quantity adjustment for each of the laser sources 503 may be achieved precisely.

According to the illustrative embodiment, the first laser-source driver 530YM causes the first laser source 503Y and the second laser source 503M to execute an exposing operation in the same period. Further, the second laser-source driver 530CK causes the third laser source 503C and the fourth laser source 503K to execute an exposing operation in the same period. That is, a single laser-source driver 530 may cause a plurality of laser sources 503 to expose the surface of the corresponding photosensitive members 610. Further, the exposing operation executed by each of the laser sources 503 is executed with reference to the receiving timing of a common BD signal (e.g., at timing t15 of FIG. 7).

The receiving timing of a BD signal from the first BD sensor 560 is determined using the laser beam L emitted from the second first light-emitting portion LDY2 of the first laser source 503Y during the light-quantity adjusting operation for the second first light-emitting portion LDY2 of the first laser source 503Y. With this configuration, as compared with a case where a BD signal is received in a period different from the period in which the light-quantity adjusting operation is executed, the executing period of the light-quantity adjusting operation may be used effectively and the number of times the second first light-emitting portion LDY2 of the first laser source 503Y emits a laser beam L may be reduced.

According to the illustrative embodiment, subsequent to start of rotation of the polygon mirror 505, the first first light-emitting portion LDY1 and the second first light-emitting portion LDY2 of the first laser source 503Y are both caused to emit laser beams L, respectively, in the respective different periods, and the first BD sensor 560 detects one of the laser beams L emitted from the light-emitting portions LDY1 and LDY2 (e.g., the period from timing t1 to timing t5 of FIG. 5). Therefore, as compared with a case where only either one of the first first light-emitting portion LDY1 and the second first light-emitting portion LDY2 is caused to emit a laser beam L therefrom during the startup process in which the scanning period and the non-scanning period have not been identified, this configuration may reduce difference in amount of heat generated by light emission between the first first light-emitting portion LDY1 and the second first light-emitting portion LDY2 of the first laser source 503Y.

Subsequent to start of rotation of the polygon mirror 505, for example, each of the light-emitting portions LDM1 and LDM2 of the second laser source 503M is caused to emit a laser beam L therefrom in the different period from the light-emitting period of the first laser source 503Y. Therefore, this configuration may reduce difference in amount of heat generated by light emission between the first laser source 503Y and the second laser source 503M.

The polygon mirror 505 is configured to deflect the laser beams L emitted from the first laser source 503Y and the second laser source 503M toward the front while deflecting the laser beams L emitted from the third laser source 503C and the fourth laser source 503K toward the rear. As described above, the laser beams L emitted from the first laser source 503Y and the second laser source 503M that are both driven by the same first laser-source driver 530YM are deflected by the polygon mirror 505 toward the same side. With this configuration, the light-quantity adjusting operation and the exposing operation both to be executed by the first laser-source driver 530YM do not coincide with each other, and therefore, the both operations may be surely executed.

In the illustrative embodiment, after the polygon mirror 505 starts rotating, the light-quantity adjusting operation for the second laser source 503M is executed subsequent to execution of the BD light emitting operation for the first laser source 503Y. Therefore, as compared with a case where the light-quantity adjusting operation for the second laser source 503M is not executed, this configuration may reduce losing balance of heat generation amount between the first laser source 503Y and the second laser source 503M. Further, after the polygon mirror 505 starts rotating, the light-quantity adjusting operation for the third laser source 503C is executed subsequent to execution of the BD light emitting operation for the fourth laser source 503K. Therefore, as compared with a case where the light-quantity adjusting operation for the third laser source 503C is not executed, this configuration may reduce losing balance of heat generation amount between the third laser source 503C and the fourth laser source 503K.

In the illustrative embodiment, the light-quantity adjusting operation for the third laser source 503C and the light-quantity adjusting operation for the fourth laser source 503K are executed in the same period as the period in which the exposing operation for the first laser source 503Y and the exposing operation for the second laser source 503M are executed. Therefore, the printing process may be executed effectively.

While the disclosure has been described in detail with reference to the specific embodiment thereof, this is merely an example, and various changes, arrangements and modifications may be applied therein without departing from the spirit and scope of the disclosure. Examples of the modification and alternations of the illustrative embodiment will be described below.

In the illustrative embodiment, the laser sources 503 each including two light-emitting portions LD have been illustrated as examples of the first, second, third, and fourth light sources. Nevertheless, in other embodiments, for example, each light source may include a single light-emitting portion or three or more light-emitting portions. The number of light-emitting portions that the first light source includes may be equal to or may be different from the number of light-emitting portions that the second light source includes. Similarly, the number of light-emitting portions that the third light source includes may be equal to or may be different from the number of light-emitting portions that the fourth light source includes.

In other embodiments, for example, a BD signal outputted from the first BD sensor 560 or the second BD sensor 570 may be received in a different period from the execution period of the light-quantity adjusting operation.

In other embodiments, for example, in the printing process, prior to the exposing operation of the third laser source 503C and the exposing operation of the fourth laser source 503K, the light quantity of the first third light-emitting portion LDC1 of the third laser source 503C and the light quantity of the first fourth light-emitting portion LDK1 of the fourth laser source 503K may be adjusted. Further, in the printing process, subsequent to the exposing operation of the third laser source 503C and the exposing operation of the fourth laser source 503K, the light quantity of the second third light-emitting portion LDC2 of the third laser source 503C and the light quantity of the second fourth light-emitting portion LDK2 of the fourth laser source 503K may be adjusted. With this configuration, prior to and subsequent to the exposing operation of the third laser source 503C and the exposing operation of the fourth laser source 503K, the same number of light-emitting portions LD may emit laser beams L in each of the third laser source 503C and the fourth laser source 503K. Therefore, this configuration may reduce occurrence of a temperature difference between the third laser source 503C and the fourth laser source 503K.

In other embodiments, for example, in the processes of FIGS. 5, 6, and 7, the details of some of the steps may be changed, some of the steps may be omitted, or the sequence of the steps may be changed. For example, in the startup process for the light sources 503, the startup process may end after a BD signal is received once, and the second reference period may be specified for the period for the light quantity adjustment for each of the light-emitting portions.

In the illustrative embodiment, the first laser-source driver 530YM is configured to drive the first laser source 503Y and the second laser source 503M, and the second laser-source driver 530CK is configured to drive the third laser source 503C and the fourth laser source 503K. Nevertheless, a single laser-source driver 530 may drive any two of the laser sources 503. In other embodiments, for example, the first laser-source driver 530YM may be configured to drive the first laser source 503Y and the fourth laser source 503K, and the second laser-source driver 530CK may be configured to drive the second laser source 503M and the third laser source 503C.

The configuration of the printer 10 according to the illustrative embodiment is merely an example and various changes or modification may be applied to the configuration of the printer 10. In illustrative embodiment, for example, the printer 10 is configured to perform printing using toners of four colors, e.g., black, yellow, magenta, and cyan. Nevertheless, the toner colors to be used for printing or the number of toner colors to be used for printing or both are not limited to the specific example.

The image forming apparatus includes not only printers but also copying machines, facsimile machines, and multi-function devices. The one or more aspects of the disclosure may be applied to such equipment.

In the illustrative embodiment, the polygon mirror 505 has been illustrated as one of the examples of the deflector. Nevertheless, in other embodiments, for example, the deflector may be a reciprocating mirror, e.g., a galvanometer mirror.

In the illustrative embodiment, the single CPU 801 may execute all of the processes. Nevertheless, the disclosure may not be limited to the specific embodiment thereof, and a plurality of CPUs, hardware, for example, an ASIC, or a combination of one or more CPUs and one or more ASICs may be used to perform the processes. The controller 800 may be a general term for hardware, e.g., the CPU 801, used for controlling the printer 10, and the controller 800 might not necessarily be a single piece of hardware equipped in the printer 10.

What is claimed is:

1. An image forming apparatus comprising:
   an exposing unit including:
   a first light source comprising:
   a first light emitter; and
   a first light receiver including a first electric output responsive to a received light quantity of the first light emitter;
   a second light source comprising:
   a second light emitter; and
   a second light receiver including a second electric output responsive to a received light quantity of the second light emitter; and
   a first light-source driver electrically connected to the first light source and the second light source, the first light-source driver including:
   a first output terminal electrically connected to the first light emitter;
   a second output terminal electrically connected to the second light emitter; and
   an input terminal electrically connected to both the first electric output and the second electric output; and
   a controller communicatively connected to the exposing unit and programmed to provide an exposing operation instruction to the first light-source driver.

2. The image forming apparatus of claim 1, wherein the first light receiver comprises a first monitor element including a first photodiode and the second light receiver comprises a second monitor element including a second photodiode.

3. The image forming apparatus of claim 1, wherein the first output terminal is configured to supply drive current to the first light emitter and the second output terminal is configured to supply drive current to the second light emitter.

4. The image forming apparatus of claim 1, wherein the first light emitter comprises a first laser diode and the second light emitter comprises a second laser diode.

5. The image forming apparatus of claim 1, wherein the first light-source driver is configured to perform:
   a first light-quantity adjusting operation in which the first light-source driver causes the first light emitter to emit light and the first light-source driver adjusts a light emission quantity of the light emitted from the first light emitter based on the first electric output from the first light receiver responsive to the light emitted by the first light emitter;
   a second light-quantity adjusting operation in which the first light-source driver causes the second light emitter to emit light and the first light-source driver adjusts a light emission quantity of the light emitted from the second light emitter based on the second electric output from the second light receiver responsive to the light emitted by the second light emitter;
   a first exposing operation in which the first light-source driver causes the first light emitter to emit light in accordance with image data to expose a surface of a first photosensitive member; and
   a second exposing operation in which the first light-source driver causes the second light emitter to emit light in accordance with the image data to expose a surface of a second photosensitive member;
   wherein:
   the first light-quantity adjusting operation is executed in a period different from a period in which the first exposing operation is executed;
   the second light-quantity adjusting operation is executed in a period different from a period in which the second exposing operation is executed; and
   the first light-quantity adjusting operation and the second light-quantity adjusting operation are executed in respective different periods.

6. The image forming apparatus of claim 5, wherein the controller causing the first light-quantity adjusting operation to be executed in a period different from a period in which the first exposing operation is executed, and causing the second light-quantity adjusting operation to be executed in a period different from a period in which the second exposing operation is executed.

7. The image forming apparatus according to claim 5, further comprising:
a deflector positioned to deflect light emitted from the first light emitter and light emitted from the second light emitter; and
an optical sensor positioned to detect the deflected light emitted by the first light emitter;
wherein, based on a timing at which the optical sensor detects the deflected light emitted by the first light emitter, the first light-source driver executes the first exposing operation and the second exposing operation.

8. The image forming apparatus according to claim 7, wherein the optical sensor comprises a BD sensor, the BD sensor configured to output a BD signal to a controller in response to the BD sensor detecting light emitted from the first light emitter, the controller operatively connected to the first light-source driver;
wherein, based on the BD signal, the controller is configured to cause the first light-source driver to execute the first exposing operation and the second exposing operation at the same time.

9. The image forming apparatus according to claim 5, wherein the first light source includes a third light emitter and the first electric output of the first light receiver is responsive to a received light quantity of the third light emitter; and
wherein the first light-source driver is further configured to:
during the first light-quantity adjusting operation, cause the first light emitter and the third light emitter to emit light in respective different periods;
based on the first electric output responsive to light emitted by the first light emitter, adjust a light emission quantity of the first light emitter; and
based on the first electric output responsive to light emitted by the third light emitter, adjust a light emission quantity of the third light emitter.

10. The image forming apparatus according to claim 9, wherein, in the first exposing operation, the first light-source driver causes the third light emitter to emit light in accordance with the image data to expose the surface of the first photosensitive member.

11. The image forming apparatus according to claim 5, wherein the first light source includes a third light emitter; and
wherein the first light-source driver is further configured to, during the first exposing operation, cause the first light emitter and the third light emitter to emit light in the same period.

12. The image forming apparatus according to claim 5, wherein the period in which the first light-quantity adjusting operation occurs is different from the period in which the second exposing operation is executed; and
wherein the period in which the second light-quantity adjusting operation occurs is different from the period in which the first exposing operation is executed.

13. The image forming apparatus according to claim 12, wherein the first light source includes a third light emitter; the image forming apparatus further comprising:
a polygon mirror positioned to deflect light emitted from the first light emitter;
a motor operatively connected to rotate the polygon mirror;
a BD sensor positioned to receive deflected light emitted by the first light emitter and the third light emitter deflected by the polygon mirror, the BD sensor configured to output a BD signal in response to detecting the deflected light;
wherein the first light-source driver is further configured to perform a BD light emitting operation after the motor initiates rotation of the polygon mirror, the BD light emitting operation including causing the first light emitter to emit light for a first reference period and causing the third light emitter to emit light for a second reference period subsequent to the first reference period, and
wherein the first and second reference periods each correspond to half of a duration of time to scan a reflecting surface of the polygon mirror by light emitted from the first light emitter.

14. The image forming apparatus according to claim 5, wherein the exposing unit further includes:
a third light source comprising:
a third light emitter; and
a third light receiver including a third electric output responsive to a received light quantity of the third light emitter;
a fourth light source comprising:
a fourth light emitter; and
a fourth light receiver including a fourth electric output responsive to a received light quantity of the fourth light emitter;
a second light-source driver electrically connected to the third light source and the fourth light source, the second light-source driver including:
a third output terminal electrically connected to the third light emitter;
a fourth output terminal electrically connected to the fourth light emitter; and
a second input terminal electrically connected to both the third electric output and the fourth electric output.

15. The image forming apparatus according to claim 14, wherein the second light-source driver is configured to perform:
a third light-quantity adjusting operation in which the second light-source driver causes the third light emitter to emit light and the second light-source driver adjusts a light emission quantity of the light emitted from the third light emitter based on the third electric output from the third light receiver responsive to the light emitted by the third light emitter;
a fourth light-quantity adjusting operation in which the second light-source driver causes the fourth light emitter to emit light and the second light-source driver adjusts a light emission quantity of the light emitted from the fourth light emitter based on the fourth electric output from the fourth light receiver responsive to the light emitted by the fourth light emitter;
a third exposing operation in which the second light-source driver causes the third light emitter to emit the light in accordance with image data to expose a surface of a third photosensitive member; and
a fourth exposing operation in which the second light-source driver causes the fourth light emitter to emit the light in accordance with the image data to expose a surface of a fourth photosensitive member;

wherein:
the third light-quantity adjusting operation is executed in a period different from a period in which the third exposing operation is executed;
the fourth light-quantity adjusting operation is executed in a period different from a period in which the fourth exposing operation is executed; and
the third light-quantity adjusting operation and the fourth light-quantity adjusting operation are executed in respective different periods.

16. The image forming apparatus according to claim 15, further comprising a polygon mirror positioned to deflect light emitted from the first light emitter and the second light emitter to a first side of an imaginary plane that includes the rotational axis of the polygon mirror and to deflect light emitted from the third light emitter and the fourth light emitter to a second side of the imaginary plane opposite the first side.

17. The image forming apparatus according to claim 16, wherein the second light-source driver is further configured to execute at least one of the third light-quantity adjusting operation and the fourth light-quantity adjusting operation in a same period as the first exposing operation is performed by the first light-source driver.

18. The image forming apparatus according to claim 16, further comprising an optical sensor positioned to detect the deflected light emitted by the first light emitter deflected by the polygon mirror, wherein:
based on a timing at which the optical sensor detects the light emitted from the first light emitter, the first exposing operation and the second exposing operation are executed in a first same period; and
based on the timing at which the optical sensor detects the light emitted from the first light emitter, the third exposing operation and the fourth exposing operation are executed in a second same period.

19. The image forming apparatus according to claim 5, wherein the first light source includes a plurality of first light emitters, and wherein the second light source includes a plurality of second light emitters.

20. The image forming apparatus according to claim 19, wherein the controller is configured to:
prior to the first exposing operation and the second exposing operation, cause the first light-source driver to execute the first light-quantity adjusting operation for one of the plurality of first light emitters and the second light-quantity adjusting operation for one of the plurality of second light emitters; and
subsequent to the first exposing operation and the second exposing operation, cause the first light-source driver to execute the first light-quantity adjusting operation for another of the plurality of first light emitters and the second light-quantity adjusting operation for another of the plurality of second light emitters.

\* \* \* \* \*